Nov. 12, 1929.  C. L. DECKARD  1,735,563
METHOD OF SECURING METAL END COUPLINGS ON TUBULAR MEMBERS
Filed May 25, 1928

INVENTOR
Charles L. Deckard.
BY
M. C. Gillham
ATTORNEY

Patented Nov. 12, 1929

1,735,563

UNITED STATES PATENT OFFICE

CHARLES L. DECKARD, OF KANSAS CITY, MISSOURI

METHOD OF SECURING METAL END COUPLINGS ON TUBULAR MEMBERS

Application filed May 25, 1928. Serial No. 280,567.

This invention relates to the process or method of securing metal end coupling members on longitudinally formed metal tubular sections to provide a joint connection of great strength for pipes, tubes, casings, sucker rods, hollow rods, and the like, and has for its object to render the process or method more expeditious, effective, and cheaper, and greatly improving the tensile strength and bursting and break capacities of the coupled joint.

Hitherto it has been the common practice to upset the end portions of the longitudinally formed metal tubular sections to provide a larger section for threading or machining. This practice results in a loss of the original tensile strength of the tubular section and forces the grain or fiber of the metal involved in the upsetting to lie at right angles to its original longitudinal arrangement. The upsetting of the end portions of the tubular section is unnecessary in practicing my process or method and the grain or fiber of the metal is left undisturbed in its original longitudinal position throughout and the tensile strength of the section unimpaired. Moreover, the metal end coupling members secured on the tubular section by my process effects greater tensile strength and greater bursting and breaking capacities in the union of the metals involved and a maximum of resistance to longitudinal pulling strains much greater than is possible by any other method.

I attain these objects and other advantages by means of the parts in combination and illustrated in the accompanying drawing in which—

Similar reference numerals refer to corresponding parts throughout the several views.

Figure 1:
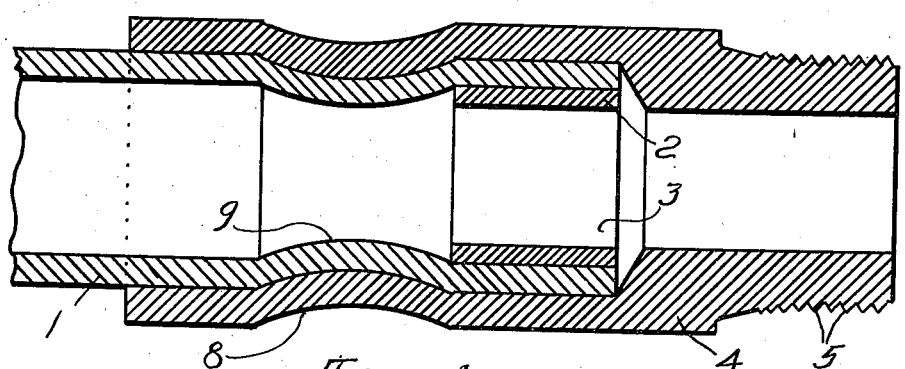
Figure 1 is a vertical section of one end portion of a longitudinally formed metal tubular section, and showing a male coupling member combined therewith.
Figure 2:
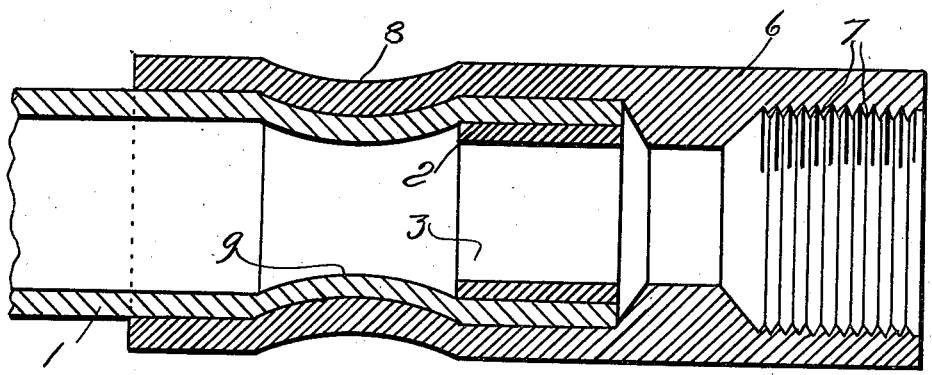
Figure 2 is a vertical section of the opposite end portion of the tubular section, and showing a female end coupling member combined therewith.
Figure 3:
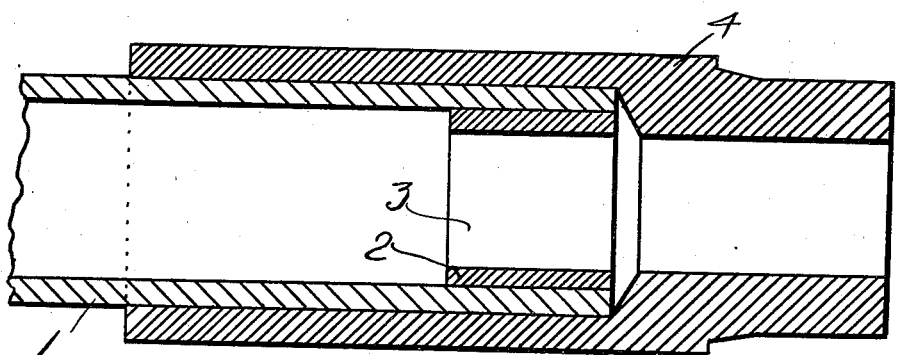
Figure 3 is a vertical section of the end portion of the tubular section, and showing a male coupling member in place after the fortifying and shrinking operation, prior to the necking and welding or fusing operation.

Referring to the drawing, the numeral 1 designates the end portion of a longitudinally formed metal tubular section having in its end a plug member 2 and which is forced into close frictional relation to the inner side of the wall of the tubular section to give support and rigidity to the wall of the tubular section. The plug is provided with an axial bore or passage 3 having a diameter a little less than the inner diameter of the tubular section. On one end portion of the tubular section is fitted in close frictional relation a male coupling member 4 having a longitudinal extension provided with external screw threads 5. On the other end portion of the tubular section is fitted in close frictional relation a female end coupling member 6 having internal screw threads 7 adapted to receive the screw extension of the male coupling member. The unit comprising the tubular section 1, the male coupling member 4 and the female coupling member 6 are annularly depressed, as shown at 8, Figs. 1 and 2, to thereby form necks 9 in the tubular section and at the inner ends of the plug members 2. The necking of the tubular section and combining the same with the plug therein and with the coupling member is preferably accomplished in one operation.

The process or method consists of combining with the end portions of longitudinally formed metal tubular sections metal end coupling members by the combined processes of fortifying, shrinking, swedging or forging, and welding or fusing the parts together to obtain great tensile strength and a maximum of bursting and breaking capacities of the coupling joints when the tubular sections are coupled longitudinally. The process or method is practiced by first cleaning the parts of and from mill scale and other foreign matter, then forcing solid plug members into the end portions of the tubular section; then heat a male and a female coupling member and shrink the same upon the end portions of the tubular section to a tight fit thereon; then subject the units thus formed to a swedging or forging heat; then swedging or forging the heated units to form area restricting necks in the tubular section at the inner ends of the plug members; then welding or fusing the parts involved in the respective units into a common mass; and then boring the plug members axially to provide passages therethrough substantially corresponding to the area of the necks in the tubular section.

While I describe the preferable method of shrinking the end coupling members by heating and cooling means, it is understood that the shrinking fit of the coupling members upon the tubular section may be accomplished by any suitable shrinking means without departing from my invention or the scope of the appended claims.

I do not restrict the welding of the coupling members and the parts associated therewith to the bringing the units to a welding heat, it being understood that such welding of the parts may be accomplished by any suitable welding or fusing means, such as electric welding or fusing or the like, without departing from my invention or the scope of the appended claims.

While I show and describe plug members to fortify the end portions of the tubular section the process may be practiced in the case of connected tubular sections not subjected to severe pulling strains by omitting the plug members. In cases where the tubular sections are connected in line for use at great depths, as in well casings, sucker rods, and the like, the fortifying plugs are essential.

I claim:—

1. The process or method of securing metal end coupling members to longitudinally formed metal tubular sections consisting of fortifying the end portions of the tubular section by forcing therein solid wall supporting and reenforcing plug members; then shrinking on the plugged end portions of the tubular section hollow metal end coupling members; then subjecting the unit thus formed to a welding or forging heat; then swedging or forging the units circumferentially of the coupling members to thereby depress the units to form area restricting necks in the tubular section at the inner ends of the plug members therein; then welding or fusing the combined plug members, the end portions of the tubular section, and the coupling members together into a mass; and then boring axially the plug members to provide passages therethrough substantially corresponding to the area of the necks in the tubular section.

2. The process or method of securing metal end couplings to longitudinally formed metal tubular sections consisting of fortifying the end portions of the tubular section by inserting solid plug members; then shrinking upon the plugged end portions of the tubular section hollow metal end coupling members; then subjecting the units thus formed to welding or forging heat; then swedging or forging a depression circumferentially of the units to thereby form area restricting necks in the tubular section at the inner ends of the plug members therein; then welding or fusing the parts of the units into a mass; and then boring axially the plug members to provide area restricted passages therethrough corresponding to the restricted area of the necks in the tubular section.

Dated, Kansas City, Missouri, May 22, 1928.

CHARLES L. DECKARD.